US 8,675,677 B2

(12) United States Patent
Wu et al.

(10) Patent No.: US 8,675,677 B2
(45) Date of Patent: Mar. 18, 2014

(54) SYSTEM AND METHOD FOR UTILIZING SPECTRAL RESOURCES IN WIRELESS COMMUNICATIONS

(75) Inventors: Shiquan Wu, Nepean (CA); Jung Yee, Ottawa (CA)

(73) Assignee: Wi-Lan, Inc., Ottawa (CA)

( * ) Notice: Subject to any disclaimer, the term of this patent is extended or adjusted under 35 U.S.C. 154(b) by 192 days.

(21) Appl. No.: 13/116,658

(22) Filed: May 26, 2011

(65) Prior Publication Data

US 2011/0228689 A1    Sep. 22, 2011

Related U.S. Application Data

(62) Division of application No. 12/078,979, filed on Apr. 9, 2008.

(51) Int. Cl.
*H04J 4/00*    (2006.01)

(52) U.S. Cl.
USPC ......................................................... 370/436

(58) Field of Classification Search
None
See application file for complete search history.

(56) References Cited

U.S. PATENT DOCUMENTS

| | | | |
|---|---|---|---|
| 4,750,036 A | 6/1988 | Martinez | |
| 5,956,642 A | 9/1999 | Larsson et al. | |
| 6,327,300 B1 | 12/2001 | Souissi et al. | |
| 6,385,434 B1 | 5/2002 | Chuprun et al. | |
| 6,389,088 B1 | 5/2002 | Blois et al. | |
| 6,505,032 B1 | 1/2003 | McCorkie et al. | |
| 6,700,939 B1 | 3/2004 | McCorkie et al. | |
| 6,735,238 B1 | 5/2004 | McCorkie | |
| 6,859,506 B1 | 2/2005 | McCorkie | |
| 6,901,112 B2 | 5/2005 | McCorkie et al. | |
| 6,909,877 B2 | 6/2005 | Rotheart et al. | |
| 6,912,372 B2 | 6/2005 | McCorkie et al. | |
| 6,931,078 B2 | 8/2005 | McCorkie | |
| 7,079,604 B1 | 7/2006 | Miller et al. | |
| 7,177,341 B2 | 2/2007 | McCorkie | |
| 7,292,622 B2 | 11/2007 | McCorkie | |
| 7,627,056 B1 | 12/2009 | Harris et al. | |
| 7,668,262 B2 | 2/2010 | Woo et al. | |

(Continued)

FOREIGN PATENT DOCUMENTS

CA    1981500 A    6/2007
CN    1481509 A    3/2004

(Continued)

OTHER PUBLICATIONS

Ying-Chang Liang and Ann Tuan Hoang, "Cognitive Radio on TV Bands: A New Approach to Provide Wireless Connectivity for Rural Areas," IEEE Wireless Communications, Jun. 2008, pp. 16-22.

(Continued)

*Primary Examiner* — Yong Zhou
(74) *Attorney, Agent, or Firm* — Procopio, Cory, Hargreaves & Savitch LLP

(57) ABSTRACT

A wireless communication system comprises a wavelet analyzer and a wavelet signal generator. The wavelet analyzer is operable to analyze wireless signals within a frequency and time map of a communications spectrum, whereby the wavelet analyzer is adapted to determine one or more available cells within the frequency and time map. The wavelet signal generator is operable to generate one or more wavelet signals for transmission within the determined one or more available cells of the frequency and time map based on the analyzed wireless signals within the frequency and time map.

19 Claims, 9 Drawing Sheets

(56) References Cited

U.S. PATENT DOCUMENTS

| | | |
|---|---|---|
| 7,689,186 B2 | 3/2010 | Matoba et al. |
| 7,710,919 B2 | 5/2010 | Woo et al. |
| 7,852,868 B2 | 12/2010 | Gardner et al. |
| 7,865,170 B2 | 1/2011 | Altizer et al. |
| 7,876,869 B1 | 1/2011 | Gupta |
| 7,969,311 B2 | 6/2011 | Markhovsky et al. |
| 8,081,997 B2 | 12/2011 | Sambhwani et al. |
| 8,150,328 B2 | 4/2012 | Chaudhri et al. |
| 8,305,917 B2 | 11/2012 | Ahuja et al. |
| 2001/0032225 A1 | 10/2001 | Tal et al. |
| 2002/0086707 A1 | 7/2002 | Struhsaker et al. |
| 2003/0021295 A1 | 1/2003 | Sahinoglu et al. |
| 2003/0096631 A1 | 5/2003 | Kayama et al. |
| 2004/0052228 A1 | 3/2004 | Tellado et al. |
| 2004/0085892 A1 | 5/2004 | Walton et al. |
| 2005/0152478 A1 | 7/2005 | Jalloul et al. |
| 2005/0156775 A1 | 7/2005 | Petre et al. |
| 2005/0254442 A1 | 11/2005 | Proctor, Jr. et al. |
| 2005/0286788 A1* | 12/2005 | Orr .............................. 382/240 |
| 2006/0008016 A1 | 1/2006 | Balakrishnan et al. |
| 2006/0067354 A1 | 3/2006 | Waltho et al. |
| 2006/0083205 A1 | 4/2006 | Buddhikot et al. |
| 2006/0128428 A1 | 6/2006 | Rooyen |
| 2006/0203794 A1 | 9/2006 | Sampath et al. |
| 2006/0215606 A1 | 9/2006 | Yeon et al. |
| 2007/0087700 A1 | 4/2007 | Tanida |
| 2007/0091998 A1* | 4/2007 | Woo et al. ................. 375/240.02 |
| 2007/0100922 A1 | 5/2007 | Ashish |
| 2007/0115878 A1 | 5/2007 | Ashish et al. |
| 2007/0117537 A1 | 5/2007 | Hui |
| 2007/0133387 A1 | 6/2007 | Arslan et al. |
| 2007/0183591 A1 | 8/2007 | Geile et al. |
| 2007/0200727 A1 | 8/2007 | Sakamoto |
| 2007/0202867 A1 | 8/2007 | Waltho et al. |
| 2007/0223582 A1 | 9/2007 | Borer |
| 2007/0249341 A1 | 10/2007 | Chu et al. |
| 2007/0253394 A1 | 11/2007 | Horiguchi et al. |
| 2008/0004839 A1 | 1/2008 | Papadimitriou et al. |
| 2008/0010208 A1 | 1/2008 | Callaway |
| 2008/0075191 A1 | 3/2008 | Haartsen |
| 2008/0080604 A1 | 4/2008 | Hur et al. |
| 2008/0086286 A1 | 4/2008 | Shellhammer |
| 2008/0086749 A1 | 4/2008 | Goldberg et al. |
| 2008/0089281 A1 | 4/2008 | Yoon et al. |
| 2008/0089306 A1 | 4/2008 | Hu |
| 2008/0102822 A1 | 5/2008 | Feng et al. |
| 2008/0108366 A1 | 5/2008 | Hu |
| 2008/0112427 A1 | 5/2008 | Seidel et al. |
| 2008/0112467 A1 | 5/2008 | Shellhammer |
| 2008/0130519 A1 | 6/2008 | Bahl et al. |
| 2008/0165680 A1 | 7/2008 | Chang |
| 2008/0165754 A1 | 7/2008 | Hu |
| 2008/0166974 A1 | 7/2008 | Teo et al. |
| 2008/0192686 A1 | 8/2008 | Cho et al. |
| 2008/0207136 A1 | 8/2008 | Tang et al. |
| 2008/0207204 A1 | 8/2008 | Vlantis et al. |
| 2008/0212725 A1 | 9/2008 | Tang |
| 2008/0259859 A1 | 10/2008 | Cordeiro et al. |
| 2008/0261639 A1 | 10/2008 | Sun et al. |
| 2008/0268832 A1 | 10/2008 | Peng |
| 2008/0268892 A1 | 10/2008 | Hamdi et al. |
| 2008/0293353 A1 | 11/2008 | Mody et al. |
| 2008/0293410 A1 | 11/2008 | Chan et al. |
| 2008/0299918 A1 | 12/2008 | Jallon |
| 2008/0305750 A1 | 12/2008 | Alon et al. |
| 2009/0060001 A1 | 3/2009 | Waltho |
| 2009/0061779 A1 | 3/2009 | Gurney et al. |
| 2009/0061887 A1 | 3/2009 | Hart et al. |
| 2009/0067354 A1 | 3/2009 | Gao |
| 2009/0080389 A1 | 3/2009 | Messerges et al. |
| 2009/0086618 A1 | 4/2009 | Muschallik et al. |
| 2009/0124208 A1 | 5/2009 | Mody et al. |
| 2009/0144791 A1 | 6/2009 | Huffman et al. |
| 2009/0196180 A1 | 8/2009 | Bahl et al. |
| 2009/0197627 A1 | 8/2009 | Kuffner et al. |
| 2009/0235316 A1 | 9/2009 | Wu et al. |
| 2009/0247201 A1 | 10/2009 | Ye et al. |
| 2009/0296751 A1 | 12/2009 | Kewitsch et al. |
| 2009/0323835 A1 | 12/2009 | Rao et al. |
| 2010/0045876 A1 | 2/2010 | Gao et al. |
| 2010/0069013 A1 | 3/2010 | Chaudhri et al. |
| 2010/0075611 A1 | 3/2010 | Budampati et al. |
| 2010/0075704 A1 | 3/2010 | McHenry et al. |
| 2010/0091919 A1 | 4/2010 | Xu et al. |
| 2010/0124254 A1 | 5/2010 | Wu et al. |
| 2010/0137014 A1 | 6/2010 | Rao et al. |
| 2010/0166053 A1 | 7/2010 | Fukuhara et al. |
| 2010/0309317 A1 | 12/2010 | Wu et al. |
| 2010/0311341 A1 | 12/2010 | Gaddam et al. |
| 2011/0002309 A1 | 1/2011 | Park et al. |
| 2011/0150105 A1 | 6/2011 | Koga et al. |

FOREIGN PATENT DOCUMENTS

| | | | |
|---|---|---|---|
| CN | 1677970 | A | 10/2005 |
| CN | 1777167 | A | 5/2006 |
| CN | 1791170 | A | 6/2006 |
| CN | 1842178 | A | 10/2006 |
| CN | 1878011 | A | 12/2006 |
| CN | 1941762 | A | 4/2007 |
| CN | 101262702 | A | 9/2008 |
| CN | 101292486 | A | 10/2008 |
| EP | 1 750 466 | A1 | 2/2007 |
| EP | 1845636 | A1 | 10/2007 |
| JP | 11-275165 | | 10/1999 |
| JP | 2005-057644 | | 3/2005 |
| JP | 2005-522061 | | 7/2005 |
| JP | 2007-036490 | | 2/2007 |
| JP | 2007-036491 | | 2/2007 |
| JP | 2007-166068 | | 6/2007 |
| WO | 2002023758 | A1 | 3/2002 |
| WO | 2006/046424 | A1 | 5/2006 |
| WO | 2007043827 | | 4/2007 |
| WO | 2007053196 | | 5/2007 |
| WO | 2007056081 | | 5/2007 |
| WO | 2007060493 | | 5/2007 |
| WO | 2007081503 | | 7/2007 |
| WO | 2007094604 | | 8/2007 |
| WO | 2007096819 | | 8/2007 |
| WO | 2007100323 | | 9/2007 |
| WO | 2008013429 | | 1/2008 |
| WO | 2008014293 | A1 | 1/2008 |
| WO | 2008032999 | | 3/2008 |
| WO | 2008060203 | A1 | 5/2008 |
| WO | 2008086243 | | 7/2008 |
| WO | 2008090506 | | 7/2008 |
| WO | 2008090509 | A2 | 7/2008 |
| WO | 2008097253 | | 8/2008 |
| WO | 2008107854 | | 9/2008 |
| WO | 2008114216 | | 9/2008 |
| WO | 2008140417 | | 11/2008 |
| WO | 2008144323 | | 11/2008 |
| WO | 2009/018300 | A1 | 2/2009 |
| WO | 2009114931 | A1 | 9/2009 |

OTHER PUBLICATIONS

International Search Report and Written Opinion for PCT/CA2009/000371, issued May 29, 2009, 9 pages.

Iancu, D., et al. "Analog Television, WiMax and DVB-H on the Same SoC Platform." Proceedings of the International Symposium on System-on-Chip, Tampere, Finland. Nov. 2006.

Narlanka, S. et al. "A Hardware Platform for Utilizing TV Bands with a Wi-Fi Radio." 15th IEEE Workshop on Local & Metropolitan Networks, Jun. 10-13, 2007, pp. 49-53.

Naveen, M.B., et al. WiMAX. Jul. 14, 2008. pp. 1-20, http://ece-www.colorado.edu/~liue/teaching/comm_standards/WiMax/WiMax_802_16e . . . .

Extended European Search Report for EP 10735465.6, dated Nov. 8, 2012, in 7 pages.

Kim et al. "A CR Platform for Applications in TV Whitespace Spectrum." Cognitive Radio Oriented Wireless Networks and Communi-

(56) References Cited

OTHER PUBLICATIONS cations. IEEE 3rd International Conference, Piscataway, NJ. 2008. pp. 1-8.
Depardo et al. "Quantifying the Impact of Unlicensed Devices on Digital TV Receivers." Retrieved from http://www.newamerica.net/files/NAF%20Spectrum%20Technical%20Report%20_FINALSUBMITTED_0.pdf. Accessed on Apr. 24, 2013. pp. 1-29, Jan. 31, 2007.
Office Action and Search Report for related CN Patent Application No. 200980134967.6 dated May 6, 2013 in 9 pages.
Extended European Search Report for related EP Patent Application No. EP 09817150.7 dated May 14, 2013 in 7 pages.
Extended European Search Report for related EP Patent Application No. 10785619.7 dated May 17, 2013 in 12 pages.
Wu et al. "Spectrum Manager White Paper: 22-09-0113-00-0000-spectrum-manager-white-paper." IEEE Draft. Piscataway, NJ, US. vol. 802.22. Jun. 19, 2009, pp. 1-13. XP017656573, retrieved on Jun. 19, 2009.
Ecclesine. "IEEE 802 Ofcom Comments: 18-09-0054-06-0000-ieee-802-ofcom-comments." IEEE Draft. Piscataway, NJ, US. vol. 802. 18, No. 6. May 1, 2009, pp. 1-11. XP017662465, retrieved on May 1, 2009.
Office Action and English translation for related JP Patent Application No. 2011-503315, dated Apr. 16, 2013, in 4 pages.
Office Action and Search Report (with translation) for related CN Patent Application No. 200980142699.2, dated Jun. 3, 2013, in 11 pages.
Office Action and Search Report (with translation) for related CN Patent Application No. 201080003588.6, dated Jul. 1, 2013, in 7 pages.
Stevenson. "IEEE starts standard to tap open regions in the TV spectrum for wireless broadband services." Oct. 12, 2004. http://standards.ieee.org/announcements/pr_80222.html, 3 pages.
International Search Report and Written Opinion as issued in International Patent Application No. PCT/CA2010/000126 on May 5, 2010, 8 pages.
International Search Report and Written Opinion as issued in International Patent Application No. PCT/CA2010/000823 on Oct. 26, 2010, 11 pages.
International Search Report and Written Opinion as issued in International Patent Application No. PCT/CA2010/000856 on Sep. 14, 2010, 8 pages.
International Search Report and Written Opinion from PCT/CA2009/001664 dated Feb. 1, 2010, 8 pages.
International Search Report and Written Opinion issued Dec. 17, 2009 in PCT/CA2009/001392, 6 pages.
Jones et al. "Initial Evaluation of the Performance of Prototype TV-Band White Space Devices." OET Report, FCC/OET 07-TR-1006, Tech. Rsch Br. Lab. Div. Office., Jul. 31, 2007 in 85 pages.
Rhodes, C., Where are the White Spaces in the TV Broadcast Spectrum? May 17, 2008 at National Translator Association pp. 1-19.
Marcus et al. "Report of the Unlicensed Devices and Experimental Licenses Working Group", Federal Communications Commission Spectrum Policy Task Force. Nov. 15, 2002. Internet Wayback Machine capture http://replay.waybackmachine.org/20041119020032/http://www.fcc.gov/sptf/files/E&UWGFinalReport.doc, Nov. 19, 2004, 24 pages.
Motorola et al., IEEE 802.22-06/0005r5, PHY Overview, Mar. 2006, 21 pages.

* cited by examiner

FIGURE 1E
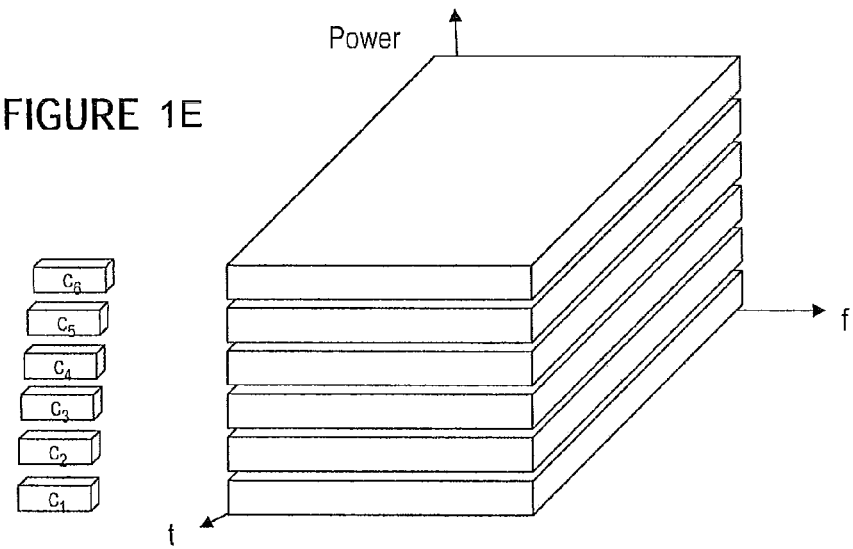
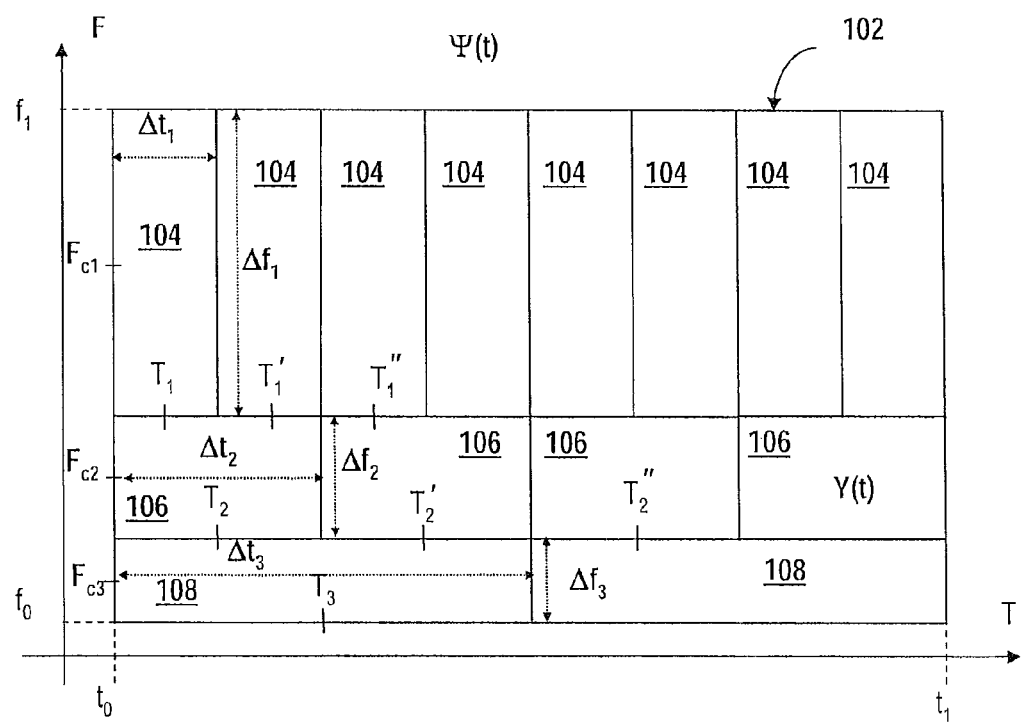
FIGURE 1F $$\Psi_{a,\tau}(t) = \frac{1}{\sqrt{a}} \Psi(\frac{t-\tau}{a}) \qquad \hat{\Psi}_{a,\tau}(\omega) = \sqrt{a}\, \exp(-j2\pi\tau\omega)\, \hat{\Psi}(a\omega)$$

$$\underbrace{\phantom{XXXXXXXX}}_{112} \qquad \underbrace{\phantom{XXXXXXXXXXXXXXXXXXX}}_{114}$$

FIGURE 1G 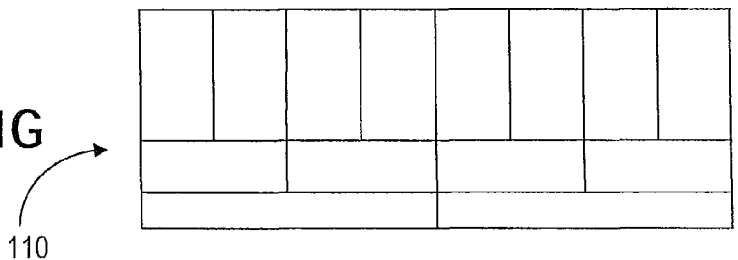

Input modulated Data
S(n,k)
210

208 { n, p, k ⇒

$$\psi_{n,k}(t) = p^{-\frac{n}{2}} \psi(p^{-n}t - k) \quad\text{— 204}$$

$$\hat{\psi}_{n,k}(\omega) = p^{\frac{n}{2}} \exp(-j2\pi k p^n \omega) \psi(p^n \omega) \quad\text{— 206}$$

202

Output Modulated Carrier Wavelet

212
$$s(t) = \sum_{n \in N} \sum_{k \in K} s(n,k) \Psi_{n,k}(t) = \sum_{n \in N} \sum_{k \in K} s(n,k) p^{-\frac{n}{2}} \Psi(p^{-n}t - k)$$

214
$$\hat{s}(\omega) = \sum_{n \in N} p^{\frac{n}{2}} \hat{\Psi}(p^n \omega) \sum_{k \in K} s(n,k) \exp(-j2\pi k p^n \omega)$$

SYSTEM AND METHOD FOR UTILIZING SPECTRAL RESOURCES IN WIRELESS COMMUNICATIONS

CROSS-REFERENCE TO RELATION APPLICATIONS

This application is a divisional of U.S. patent application Ser. No. 12/078,979 filed on Apr. 9, 2008, and the contents of which is incorporated herein by reference in its entirety.

FIELD OF THE INVENTION

The present invention relates generally to wireless communications, and more particularly to a system and method for utilizing the transmission resources of a wireless communication spectrum.

BACKGROUND OF THE INVENTION

The evolving world of telecommunications is continuously providing various technological advancements for enabling the reliable transmission and reception of data information. As the need for more data increases with the seductive lure of multimedia data services such as video phone capabilities, MP3 downloading, video downloading, and other such content, so does the need for increased communication bandwidth, communication link reliability, and communication link resource management. These established needs especially apply to the area of wireless communications, since within any geographical region supporting wireless communications, finite and limited communication spectrum resources are shared among multiple users.

Wireless communication systems generally use, among other things, data compression, data modulation techniques, protocols, and access technologies for utilizing/sharing transmission bandwidth. There are numerous multiplexing techniques in the field of wireless communications that allow a plurality of user terminals, such as cell phones, TV channels, WiFi devices, BlueTooth devices etc., to share a common transmission resource. Such shared common resources may include, among other things, the transmission bandwidth, or one or more portions of the radio frequency spectrum.

Access technologies provide communication channels to various users by allocating transmission time, transmission frequency, both transmission time and transmission frequency, or by utilizing other techniques such as the application of unique codes (e.g., Pseudo Random Binary Sequences) in an attempt to facilitate the sharing of the wireless communication spectrum among various users. Some examples of existing access technologies are Frequency Division Multiple Access (FDMA), Time Division Multiple Access (TDMA), Code Division Multiple Access (CDMA), and Orthogonal Frequency Division Multiplexing (OFDM).

RF channels used by current wireless communication technologies adopting access techniques such as FDMA, TDMA, CDMA, and OFDM are usually pre-designed. Namely, the channels are defined either in frequency, in time, in frequency and in time, or in frequency and codes. In principle, generally, users share a piece of spectrum and release it when communication is completed. For example, GSM accommodates more than 8 simultaneous calls within a 200 kHz channel (8 time slots allocated per 200 KHz), CDMA accommodates around 50 calls per 1.25 MHz (where 64 Walsh codes are allocated) of allocated bandwidth, while 3GPP/UMTS may simultaneously accommodate 128 calls within a 5 MHz spectrum. FIGS. 1A-1E illustrate some of these known access techniques.

FIG. 1A illustrates spectral resource allocation in systems adopting FDMA, where the spectrum is divided into smaller disjoint frequency bands (i.e., $b_1$-$b_6$) each representing a communication channel (i.e., $n_1$-$n_6$). In FDMA, each channel uses the frequency band for the entire time. Systems that may use FDMA are, for example, TV and music broadcasting systems. As shown in FIG. 1B, FDMA systems use guard bands in order to avoid adjacent channel interference. In contrast to FDMA, FIG. 1B also illustrates the allocation of spectrum in OFDM systems. OFDM uses many subcarriers/tones to carry information. Data information associated with each user is encoded onto multiple overlapping subcarriers/tones. Since these subcarriers/tones are orthogonal to each other, no adjacent channel interference is experienced. However, the overlapping subcarriers/tones facilitate an increase in spectrum utilization from a frequency allocation perspective. Systems that use OFDM are, for example, 802.11, 802.16x, WiMAX, 802.20, Wibro (Korea) 3GPP LTE, UMB, DVB-T, and DVB-H. FIG. 1C illustrates spectral resource allocation in systems adopting TDMA, where each channel (i.e., $n_1$-$n_6$) utilized the entire spectrum for a certain amount of time (i.e., $t_1$-$t_6$). FIG. 1D illustrates spectral resource allocation in systems adopting both frequency and time multiplexing, where each channel (e.g., $n_1$) is assigned a certain frequency band (e.g., $f_1$) for a certain amount of time (e.g., $t_1$). The adoption of such a spectrum allocation methodology includes dividing the frequency and time map (or plan) into rectangles. GSM systems are among those that utilize both frequency and time multiplexing such as that illustrated in FIG. 1D. FIG. 1E illustrates spectral resource allocation in systems adopting CDMA, where each channel (i.e., $c_1$-$c_6$) has a unique code. As illustrated, all the channels (e.g., $c_1$-$c_6$) use the entire frequency spectrum (i.e., F), the entire transmission time (i.e., T), and each individual channel is allocated a certain portion of power (i.e., $P_1$-$P_6$).

The data information carrying waveforms (i.e., carrier signals) used by these access technologies are also pre-designed with a view to keeping adjacent channels well separated for avoiding/reducing inter-channel interference. For example, GSM uses a Gaussian like waveform, W-CDMA uses a root raised cosine (RRC), and OFDM uses rectangular pulses. Therefore, providing data information carrying waveforms that permit efficient spectrum utilization while maintaining channel integrity is highly desirable.

According to at least one aspect, a novel system and method for utilizing transmission bandwidth within a communication spectrum is provided.

SUMMARY OF THE INVENTION

According to these and other aspects, wavelet signal generation and analysis is used to facilitate the efficient use of wireless communication spectra. The communication spectrum, whether regulated or unregulated, may be divided into a frequency and time map having a plurality of frequency-time cells. Each frequency-time cell within the frequency and time map constitutes at least one channel that may be utilized for communication purposes. Using wavelet signal analysis, signal energy within each of the frequency-time cells is measured in order to identify frequency-time cells with little or no detectable signal activity. By identifying such frequency-time cells, a communication system may take advantage of instances within a communication spectrum where one or more frequency-time cells occupied by one or more designated users are capable of being shared by other users of the communication spectrum. Such identified frequency-time cells provide an opportunity for signal transmission and reception during communication inactivity periods within the frequency-time cells. This allows other users to take advantage of spectrum resources (i.e., identified frequency-time cells) during periods where the frequency-time cells are not being utilized by the one or more designated users.

Depending on various communication related factors (e.g., center frequency, frequency bandwidth, and time slot of the frequency-time cell; data information bandwidth; etc.), a communication device selects/generates a wavelet carrier signal having the appropriate waveform characteristics for transmission within these available channels.

Once available channels are detected, prior to signal transmission using the carrier wavelet signals, a control channel (i.e., a rendezvous channel) is used to perform handshaking operations, whereby transmission information (i.e., time slot duration, bandwidth, transmission frequency, etc.) associated with the available channels is conveyed to recipient communication devices (e.g., PDA, cell phone). Each recipient may then receive data information via a modulated wavelet carrier waveform. Accordingly, communication spectrum resources are continuously sensed and utilized in order to dynamically maximize the utility of all available cells, and thus, designated channels.

According to one aspect, a wireless communication system comprises a wavelet analyzer and a wavelet signal generator. The wavelet analyzer is operable to analyze wireless signals within a frequency and time map of a communications spectrum, whereby the wavelet analyzer is adapted to determine one or more available cells within the frequency and time map. The wavelet signal generator is operable to generate one or more wavelet signals for transmission within the determined one or more available cells of the frequency and time map based on the analyzed wireless signals within the frequency and time map.

According to another aspect, a wireless communication system comprises a receiver portion and a transmitter portion. The receiver portion is operable to receive wireless signals associated with a frequency and time map within a communications spectrum, whereby using wavelet analysis, the receiver portion is adapted to analyze the wireless signals for determining one or more available cells within the frequency and time map. The transmitter portion is coupled to the receiver portion and operable to modulate one or more wavelet signals with data for transmission within the determined one or more available cells of the frequency and time map.

According to yet another aspect, a wavelet signal generation device for wireless transmission comprises an analog to digital converter device operable to convert received wireless signals into digitized signals. The wavelet signal generation device also comprises a digital signal processor device operable to perform wavelet analysis on the digitized signals for determining one or more available cells within a frequency and time map of a communications spectrum. The digital signal processor device then generates one or more wavelet signals for transmission within the determined one or more available cells within the frequency and lime map of the communications spectrum.

According to another aspect, a wireless communication system comprises a wavelet analyzer and a wavelet signal generator. The wavelet analyzer is operable to analyze wireless signals within a frequency and time map of a communications spectrum, where the wavelet analyzer is adapted to determine one or more available cells within the frequency and time map. The wavelet signal generator is adapted to generate daughter wavelets from a selected mother wavelet, wherein the wavelet signal generator generates one or more daughter wavelets for transmitting data information within the determined one or more available cells. The system may further comprise a memory that is operable to store mother wavelets associated with each cell within the frequency and time map.

According to another aspect, a method of utilizing a wireless communication spectrum is provided. The method comprises receiving wireless signals associated with a frequency and time map within the wireless communication spectrum and determining signal strength for the received wireless signals using wavelet analysis. The signal strength is determined for at least one cell within the frequency and time map and the at least one cell is then allocated for wireless transmission based on a threshold value exceeding the determined signal strength.

According to another aspect, a method of utilizing a wireless communication spectrum is provided. The method comprises allocating a plurality of frequency and time cells associated with the wireless communication spectrum, where each of the plurality of frequency and time cells are scalable in time and frequency. Wireless signal strength within each of the plurality of frequency and time cells is measured using wavelet analysis. One or more of the plurality of frequency and time cells are determined based on the measured wireless signal strength. One or more wavelet signals are then transmitted within the determined one or more of the plurality of frequency and time cells.

According to another aspect, another method of utilizing a wireless communication spectrum is provided. The method comprises scanning a frequency and time map having a plurality of cells for detecting at least one wireless signal, where each of the plurality of cells is scalable in time and frequency. A wavelet signal is generated for wireless transmission within any one of the plurality of cells if: (1) the at least one wireless signal is undetected within the any one of the plurality; or (2) using wavelet analysis, the detected at least one wireless signal within the any one of the plurality of cells comprises a signal strength below a threshold value.

BRIEF DESCRIPTION OF THE DRAWINGS

One or more exemplary embodiments will now be described more fully with reference to the accompanying drawings in which:

FIGS. 1A-1E are examples of known access technologies used to allocate communication spectrum resources;

FIG. 1F is an example of a frequency and time map according to one aspect;

FIG. 1G is an example of another frequency and time map associated with the frequency and time map of FIG. 1F;

FIG. 2 illustrates a wavelet generator according to one aspect;

DETAILED DESCRIPTION OF THE EMBODIMENT

In the following description, one or more aspects utilize wavelet analysis to establish a means of managing and controlling transmission resources within a wireless communication spectrum. Accordingly, the communication spectrum is analyzed to determine available spectral resources (i.e., allocation of frequency span and/or time slots). Modulated carrier wavelet waveforms or signals are then generated in accordance with the characteristics of these determined spectral resources (e.g., available bandwidth, available time slot, etc.). Although the various aspects and embodiments herein described refer to various wireless implementations, it will however be appreciated that these methods and systems are also applicable to wireline transmission.

According to the various embodiments described herein, the generally accepted definitions of a spectrum and a channel may refer to both a frequency and time "spectrum," and a frequency and time "channel," respectively.

Thus, in order to optimize the "frequency-time" resources available in a communication system, data information is carried by specific waveforms called wavelets.

A wavelet is represented by a mathematical function that divides a given function or continuous-time signal into different frequency components. A wavelet is generated from a single mathematical function ($\psi(t)$) called a mother wavelet, which is a finite-length or fast-decaying oscillating waveform both in time and in frequency. Mother wavelets also include some special properties such as their integer translations and dyadic dilations, which form an orthogonal basis for the energy-limited signal space. Daughter wavelets are scaled ($\alpha$) and translated ($\tau$) copies of the mother wavelet. Wavelet transforms have advantages over traditional Fourier transforms for representing functions that have discontinuities and sharp changes (as inherent in user data). Moreover, wavelet transforms provide a means for accurately deconstructing and reconstructing finite, non-periodic and/or non-stationary signals, which Fourier Transforms usually cannot do. In telecommunications, the use of wavelets for the generation of carrier signals provides, among other things, a well localized energy distribution, such that approximately 99% of carrier signal energy may be concentrated within a finite interval in both time and frequency domains. Such energy localization in a transmitted carrier signal provides a mechanism for the reduction of co-channel interference between neighbouring carrier signals sharing a communication spectrum.

Figure 1A:
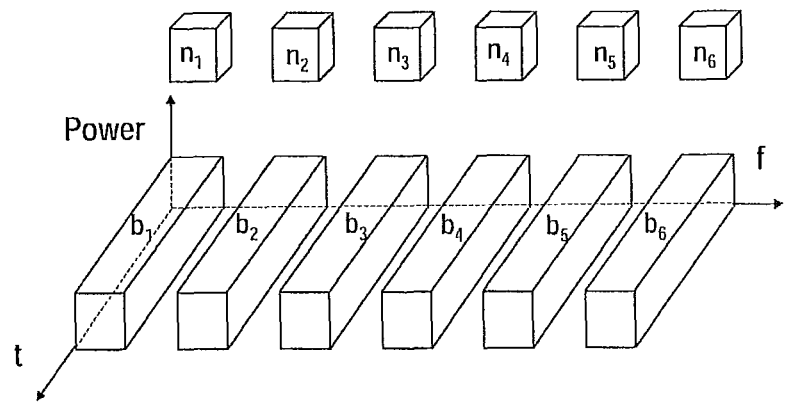
Figure 1B:
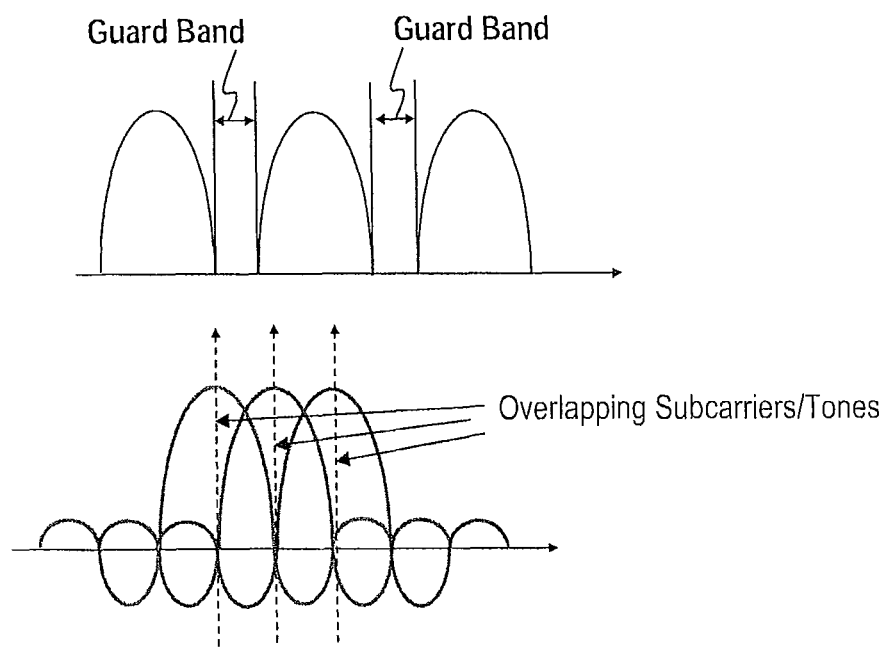
Figure 1C:
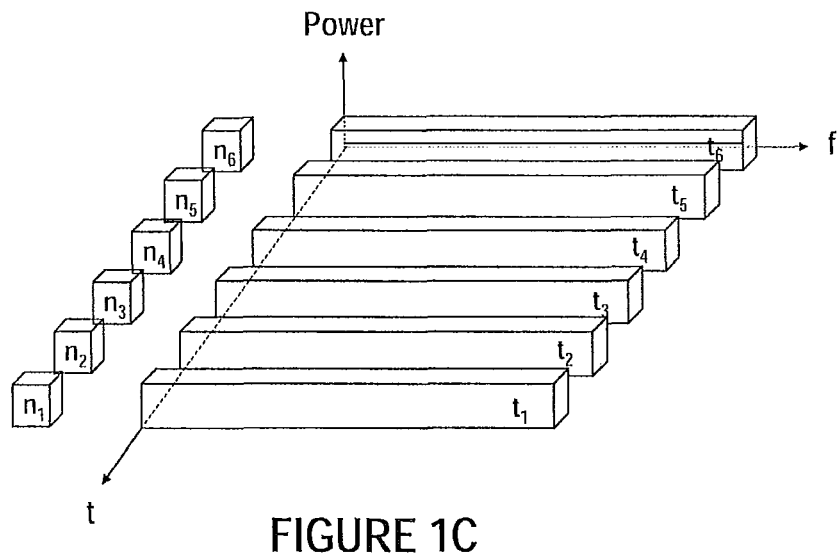
Figure 1D:
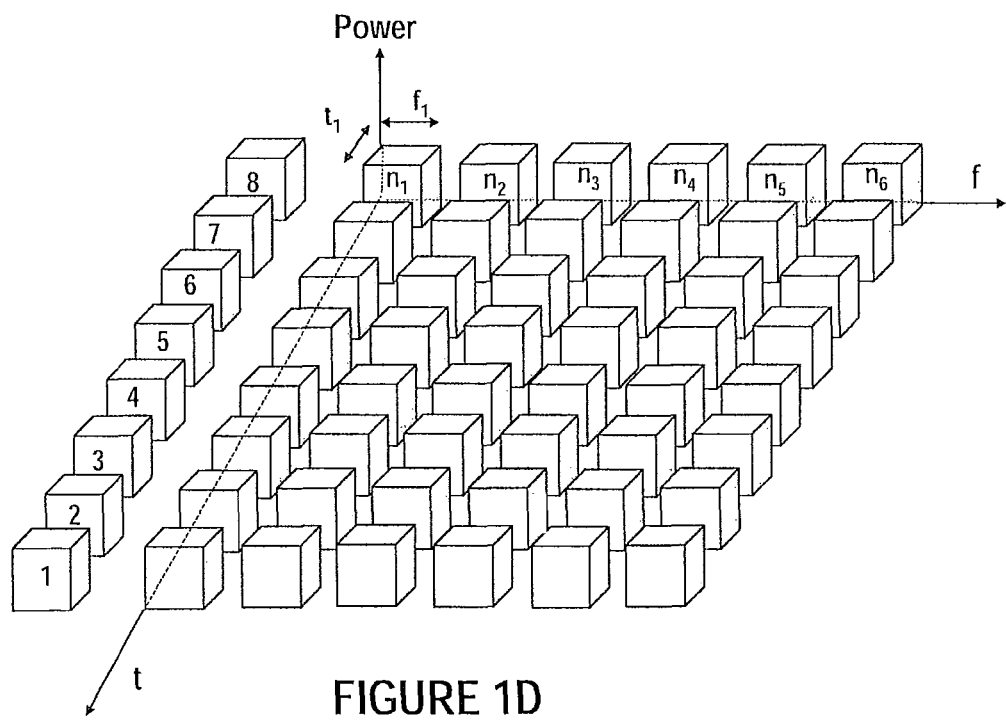

FIG. 1F shows an example of a frequency and time map (or plan) 100 used in association with a wavelet. The frequency and time map 100 comprises a plurality of frequency and time cells 102, whereby each of the plurality of frequency and time cells 102 is representative of a portion of the wireless communication spectrum that may be allocated as a channel for carrier signal transmission and/or reception (i.e., communication). The scaling and translation parameters of the wavelet function enable the frequency and time map 100 to be divided according to a variable time-frequency resolution. For example, by setting the scaling parameter to a first value and incrementing the translation parameter, a plurality of cells 104 having a bandwidth of $\Delta f_1$ and a time slot interval of $\Delta t_1$ are provided. By setting the scaling parameter to a second value and incrementing the translation parameter, a plurality of cells 106 having a reduced bandwidth of $\Delta f_2$ and an increased time slot interval of $\Delta t_2$ are provided. Accordingly, setting the scaling parameter to a third value and incrementing the translation parameter provides a plurality of cells 108 having a further reduced bandwidth of $\Delta f_3$ and a further increased time slot interval of $\Delta t_3$.

As illustrated in FIG. 1F, wavelets provide an opportunity for the scalable division of wireless communication spectra in both time and frequency, thus facilitating the efficient use of available spectral resources. Using the wavelet function, each cell within the frequency and time map 100 may be further divided into frequency and time cells according to another frequency and time map. For example, right hand cell 106 may be further divided into frequency and time cells based on another wavelet function Y(t). An example of the division of right hand cell 106 into additional frequency and time cells 110 is shown in FIG. 1G.

FIG. 1G also shows a mother wavelet equation $\psi_{\alpha,\tau}(t)$ 112 and its corresponding frequency domain representation $\psi_{\alpha,\tau}(\omega)$ 114. Referring to wavelet equation $\psi_{\alpha,\tau}(t)$ 112, $\alpha$ represents the scaling parameter of the wavelet waveform, while $\tau$ represents the shifting or translation parameter of the wavelet waveform. The scaling parameter will affect the pulse shape with energy conservation, whereby if the pulse shape is dilated in the time domain, it will shrink in the frequency domain. Alternatively, if the pulse shape is compressed in the time domain, it will expand in the frequency domain.

For example, a positive increase in the value of $\alpha$ compresses the wavelet waveform in the time domain. As described, due to the conservation of energy principle, the compression of the wavelet waveform in time, translates to an increase in frequency bandwidth. Conversely, decreasing the value of $\alpha$ dilates the wavelet waveform in the time domain, while reducing frequency bandwidth. This is illustrated in FIG. 1F, where decreasing the value of $\alpha$ (i.e., scaling parameter) and dilating the wavelet waveform in the time domain has the effect of reducing the value of $\Delta f$ (e.g., $\Delta f_2$ compared to $\Delta f_1$), while increasing $\Delta t$ (e.g., $\Delta t_2$ compared to $\Delta t_1$).

The shifting parameter $\tau$ represents the shifting of the energy concentration center of the wavelet waveform in time. Thus, as shown in FIG. 1F, by increasing the value $\tau$, the wavelet shifts in a positive direction (i.e., in the direction of $t_1$) along the T axis. For example, for a given $\alpha$ value providing a bandwidth of $\Delta t_1$ and a time slot interval of $\Delta t_1$, increasing $\tau$ incrementally shifts the wavelet across cells 104 (i.e., from $T_1$ to $T_1'$ to $T_1''$, etc.). Based on another example, for a given $\alpha$ value providing a bandwidth of $\Delta f_2$ and a time slot interval of $\Delta t_2$, increasing $\tau$ incrementally shifts the wavelet across cells 106 (i.e., from $T_2$ to $T_2'$ to $T_2''$, etc.). Both the shifting and scaling parameters of wavelets therefore provide the ability to dynamically adjust the resolution of the wavelet waveform in both time and frequency. Accordingly, the wavelet waveform characteristics may be manipulated to accommodate the different frequency-time cells and thus channels within the frequency and time map 100.

Mother wavelet waveforms are chosen to include several properties such as $\int \psi_{\alpha,\tau}(t)=0$. The mother wavelet waveforms are also well localized in both time and frequency, such that approximately 99% of the wavelet energy is concentrated within a finite interval in both the time and frequency domain. Moreover, the mother wavelet waveforms are capable of integer shifts or translations of their concentration centers, such that adjacent shifted waveforms (i.e., $\omega(t-\tau)$) may be generated to form an orthogonal basis.

Referring to mother wavelet equation $\psi_{\alpha,\tau}(t)$ 112 and its corresponding frequency domain representation $\psi_{\alpha,\tau}(\omega)$ 114, if we designate $\alpha=p^n$ and $\tau=kp^n$, where "p" is a positive rational number (e.g., 1.2, 2, 2.1, 3, etc.) and "k" and "n" are integers (e.g., 0, +/−1, +/−2, +/−3, etc.), then:

$$\psi_{n,k}(t) = p^{-\frac{n}{2}}\psi(p^{-n}t-k) \qquad \text{Equation 1.1}$$

where the frequency domain representation of Equation 1.1 is given as:

$$\hat{\psi}_{n,k}(\omega) = p^{\frac{n}{2}}\exp(-j2\pi kp^n\omega)\psi(p^n\omega) \qquad \text{Equation 1.2}$$

The mathematical representations of Equations 1.1 and 1.2 form the basis of a mother wavelet signal that generates different daughter wavelet signals by applying different values to the scaling (p, n) and shifting (k) parameters. Thus, each daughter wavelets is generated for transmission within each cell of the frequency and time map.

FIG. 2 illustrates a wavelet generator 200 according to one aspect. Wavelet generator 200 may include a processing device 202 having a transfer function given by wavelet equation $\psi_{n,k}(t)$, as indicated at 204, and described above in relation to Equations 1.1 and 1.2. A corresponding frequency domain representation of wavelet equation $\omega_{n,k}(t)$ is given by wavelet equation $\psi_{n,k}(\omega)$, as indicated at 206. The processing device 202 may implement this transfer function in the form of, for example, either a digital filter or an analog filter. Within processing device 202, wavelet parameters 208 enable the generation of daughter wavelet waveforms that are customized to operate within a particular portion of a communication spectrum (e.g., a frequency and time cell) having a specific bandwidth and time slot interval. In operation, an input signal 210 such as input data signal $S_{n,k}$ is applied to the wavelet processing device 202. Wavelet processing device 202 then combines the input signal 210 with a specific daughter wavelet waveform to generate a modulated carrier wavelet 212 such as S(t). A corresponding frequency domain representation of modulated wavelet S(t) is given by wavelet equation S($\omega$), as indicated at 214.

The modulated wavelet S(t) is generated for transmission within a particular portion of a communication spectrum (e.g., a frequency and time cell) based on a number of factors such as, but not limited to, the availability of one or more frequency and time cells within a portion of the communication spectrum, bandwidth or data rate requirements for the input data signal, packet size of the input data signal, coding/modulation granularity considerations, and the requirements associated with the data service type (e.g., based on latency critical data such as real time images or burst type data). Setting the values of the wavelet parameters (i.e., n, k, and p), enables these and other factors to be considered during the generation of the modulated wavelet S(t). Wavelet equation $\psi_{n,k}(t)$, as indicated at 204, includes p and n parameters for providing scaling, and the k parameter for waveform shifting or waveform repositioning at different time intervals.

Figure 3:
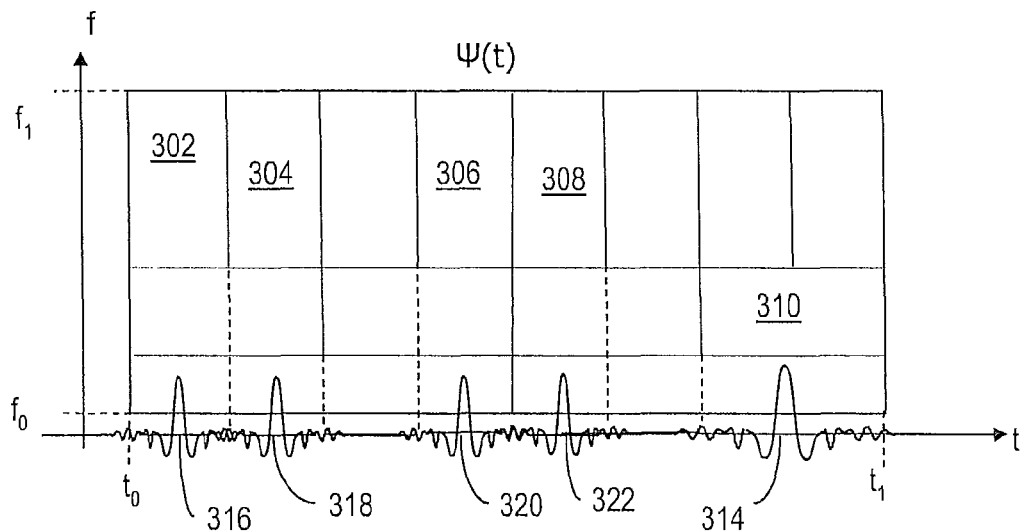
FIG. 3 is yet another example of a frequency and time map illustrating available cell resources for potential wireless transmission.

For example, referring to FIG. 3, frequency and time map 300 comprises several available frequency and time cells 302-310 for potential carrier signal transmission. Based on different factors, a user may elect to transmit data within any one or more of the available frequency and time cells 302-310. If, for example, the data comprises a high data rate and large packet size, it may be prudent to allocated high bandwidth neighbouring cells 302 and 304, or 306 and 308, as a transmission resource. Alternatively, for lower bandwidth applications having data with lower data rates, a cell having a lower bandwidth and wider time slot interval, such as cell 310, may be utilized. As illustrated, the shape of the wavelet waveforms also vary based on the characteristics of the frequency and time cells. At cell 310, the bandwidth is reduced and the time slot interval is increased relative to cells 302-308. Accordingly, waveform 314 operating in cell 310 has an increased dilation relative to waveforms 316-322 operating in cells 302-308, respectively. By dilating waveform 314, its frequency content is reduced in order to accommodate the lower bandwidth requirements of cell 310.

Figure 4:
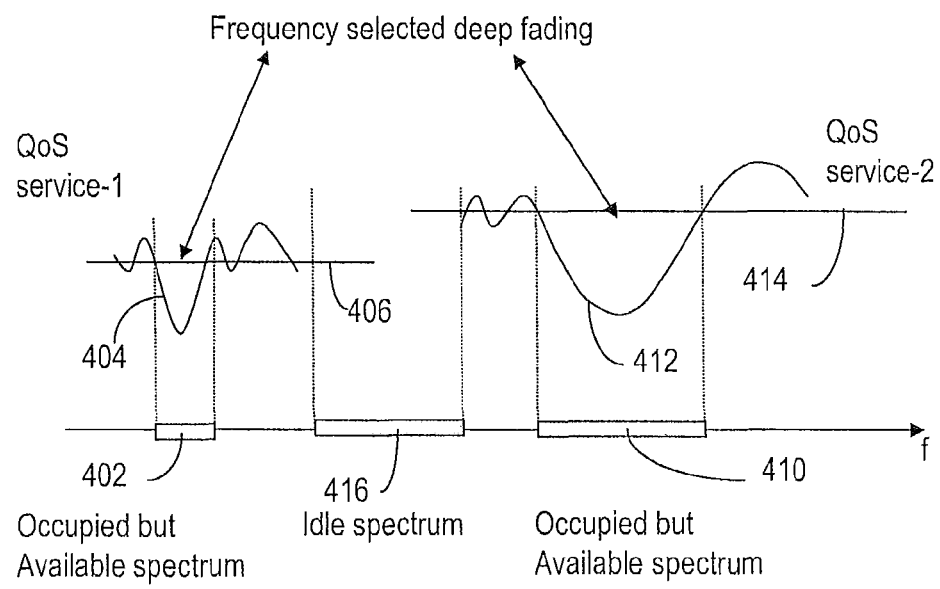
FIG. 4 illustrates the occupation of communication resources within a wireless communication spectrum.

FIG. 4 illustrates the potential availability of communication resources within a wireless spectrum. As previously described, wavelets can be used to generate well defined carrier signals capable of operating within different frequency and time cells, ranging from high-bandwidth/short time-interval to low-bandwidth/longer time-interval cells. Using the wavelet, time and frequency parameters of the cells may be varied to accommodate different resolutions. For example, by increasing the resolution in the frequency domain, resolution in the time domain is reduced. Conversely, decreasing the resolution in the frequency domain causes an increase in time domain resolution. With this flexibility in mind, wavelet carrier signals can be generated within any available portion of a wireless spectrum, whereby availability is determined based a number of factors.

As illustrated in FIG. 4, multipath propagation effects may cause wireless signals to drop in energy level. For example, a portion of the wireless spectrum, as defined by 402, may become potentially available when a signal 404 operating within this portion of the spectrum falls below a certain threshold 406 as a result of propagation effects such as multipath fading. Similarly, another portion of the wireless spectrum, as defined by 410, may also become potentially available when signal 412 also falls below threshold 414 as a result of multipath fading. In the provided examples, using a mother wavelet, an appropriate carrier signal may be generated for transmission based on both the available time slot and bandwidth created as a result of the fading. In addition to using occupied regions of the wireless spectrum that become available as a result of fading, idle spectral resources 416 caused by, among other things, low levels of utilization (e.g., phone conversation silences) are also available for signal transmission using generated wavelet waveforms. Generally, wavelet signal generation and analysis facilitates the increased utilization of a wireless communication spectrum by enabling signal transmission within both occupied and unoccupied portions of the wireless spectrum.

The availability of one or more portions of the communication spectrum depends on either the absence of a detectable wireless signal at a particular portion of the wireless communication spectrum, or the energy of a detectable wireless signal at a particular spectral portion being below a certain predetermined threshold level. This threshold level may be set according to different criteria relating to the communication system in operation. For example, a microwave communication link may transmit wireless signals at a different energy level than a cellular wireless system. Thus, threshold energy levels for each system may accordingly differ. Generally, within a portion of a wireless communication spectrum, a threshold energy (or power) level may be set at a level where a detected wireless signal has deteriorated beyond the ability of the receiver to successfully demodulate and recover data information from the wireless signal.

One or more portions of a wireless communication spectrum may include any allocated spectral resource used to exploit the wireless communication spectrum for information conveyance. These allocated spectral resources may include frequency intervals, time slots, spatially available regions (e.g., line-of-sight communications), and generally, any property of the communication spectrum that facilitates sending data information to a recipient. For example, the one or more portions of the wireless communication spectrum may include, without limitation, an entire frequency range associated with a wireless communication spectrum, a frequency range within a wireless communication spectrum, a frequency channel within a wireless communication spectrum, any portion of a frequency channel within a wireless communication spectrum, a time slot associated with a frequency channel within a wireless communication spectrum, a time slot associated with a portion of a frequency channel within a wireless communication spectrum, a frequency and time cell associated with a frequency and time map of a wireless communication spectrum, and a portion of a frequency and time cell associated with a wireless communication spectrum.

Figure 5:
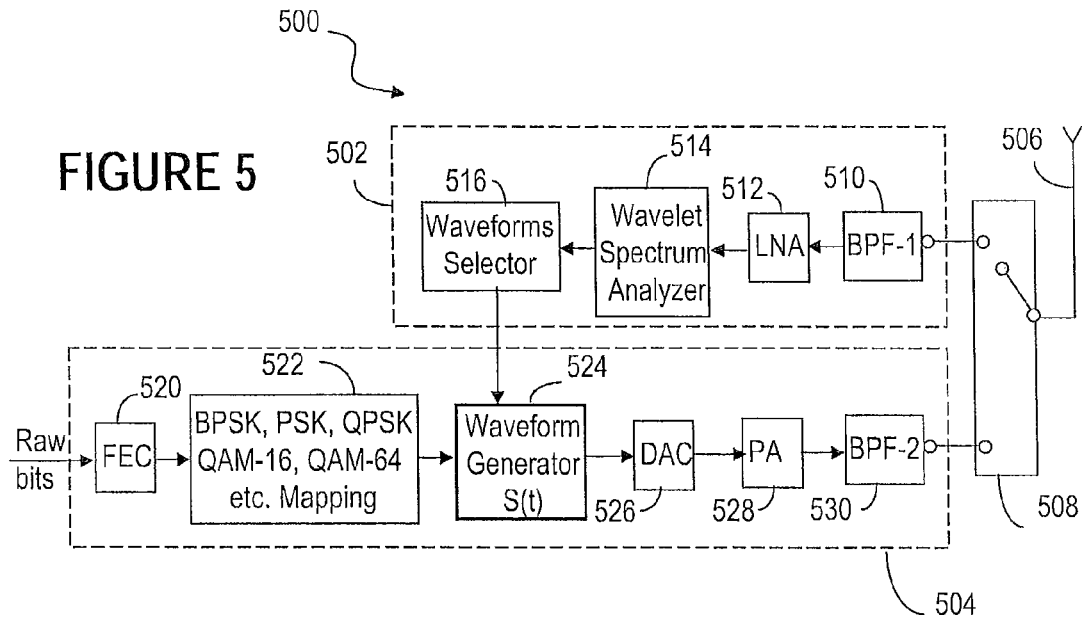
FIG. 5 is a system block diagram of a communication system according to one aspect.

FIG. 5 is a system block diagram of a communication system 500 according to one aspect. Communication system 500 comprises a receiver portion 502 and a transmitter portion 504, whereby both the transmitter 504 and receiver 504 portions are coupled to an antenna unit 506 via antenna switch 508.

The receiver portion 502 monitors or scans the communication spectrum in order to determine the magnitude of wireless signal energy occupying different portions (e.g., frequency channels) of the wireless communication spectrum. By detecting wireless signal energy (or power) activity, the receiver portion 502 identifies one or more portions of the communication spectrum that are available for wireless signal transmission. Once the receiver portion 502 identifies the available one or more portions of the communication spectrum, the transmitter portion accordingly generates data modulated wavelet waveforms for transmission within these determined one or more portions of the communication spectrum.

Receiver portion 502 includes an optional band-pass filter 510, a low noise amplifier 512, a wavelet spectrum analyzer 514, and a waveforms selector unit 516. Band-pass filter 510 is coupled to antenna unit 506 via switch 508, whereby the antenna unit couples received wireless signals to the band-pass filter 510 for optional filtering. The low noise amplifier 512 is coupled to both the band-pass filter 510 and the wavelet spectrum analyzer 514. The filtered signals from the band-pass filter 510 are received and amplified by the low noise amplifier 512 prior to being sent to the wavelet spectrum analyzer 514. The wavelet spectrum analyzer 514 is coupled to the low noise amplifier 512 and the waveforms selector unit 516. Using wavelet analysis, the amplified signals received from the low noise amplifier 512 are processed by the wavelet spectrum analyzer 514 in order to determine their respective signal energy or power levels.

At the waveforms selector unit 516, each of the signal energy or power levels determined by the wavelet spectrum analyzer 514 is compared to a threshold energy or power level. The signals that comprise a calculated energy or power level less than, or at the threshold value, are selected in order to identify their position (i.e., frequency location) and bandwidth within the wireless communication spectrum. These positions and corresponding bandwidths define the regions of the wireless communication spectrum that are available for utilization.

A wavelet waveform generator 524 within the transmitter portion 504 receives each identified position and bandwidth associated with the selected signals from the waveforms selector unit 516 in the form of p, n, and k parameters. The wavelet waveform generator 524 then generates wavelet waveforms (i.e., daughter wavelets) for transmission within the available regions of the wireless spectrum based on the identified positions and bandwidths of the selected signals.

The transmitter portion 504 includes an error correction unit 520, a modulator unit 522, a wavelet waveform generator 524, a digital-to-analog converter 526, a power amplifier 528, and an optional band-pass filter 530. Data information designated for transmission may be encoded by an error correction unit 520. At the error correction unit 520, the information data is encoded with redundant bits in order to identify and correct bit-errors that may occur as a result of the transmission medium (i.e., air). Many different error correction techniques may be employed. For example, a simple error detection method such as the inclusion of parity bits can be used. Alternatively, more complex error detection and correction techniques such as Reed-Solomon encoders or turbo encoders may be utilized. Error correction unit 520 is coupled to modulator unit 522. At the modulator unit 522, using different modulation techniques, the encoded data information may be modulated directly onto a waveform generated by wavelet generator 524. Alternatively, the modulator unit 522 modulates the encoded data information onto a subcarrier signal. The subcarrier modulated signal is then applied to a carrier waveform generated by wavelet generator 524. For example, modulator 522 may provide binary phase shift key (BPSK) modulation, phase shift key (PSK) modulation, quadrature phase shift key (QPSK) modulation, frequency shift key (FSK) modulation, quadrature amplitude (QAM) modulation, QAM-16 modulation, or any other modulation principle. Modulation techniques, as with error correction encoding, are selected on the basis of several factors such as system complexity, required signal to noise ratio, error probability acceptance, etc. Modulator unit 522 is coupled to wavelet waveform generator 524, whereby based on the output of the waveforms selector unit 516, the wavelet generator 524 combines the modulated data information with the selected waveform. According to one embodiment, wavelet generator 524 may include a wavelet generator such as that illustrated in FIG. 2 and described herein. The modulated wavelet waveform output from the wavelet generator 524 may then be applied to a digital-to-analog (DAC) 526. The DAC 526 may be incorporated within the transmitter portion 506 when the wavelet generator 524 generates a digitized output. This may occur when the wavelet generator 524 is implemented using a digital device such as a digital filter. The DAC 526 may be omitted on occasions where the wavelet generator 524 is implemented using an analog device such as an analog based filter. The DAC 526 is coupled to the power amplifier 528, whereby the analog modulated wavelet waveform output from the DAC 526 is received by the power amplifier 528 for amplification. Once amplified, the waveform modulated wavelet is filtered by an optional band-pass filter 530 prior to being coupled to the antenna unit 506 via switch 508. At the antenna unit 506, the amplified and modulated wavelet waveform (or wavelet signal) is transmitted within one of the identified regions of the wireless communication spectrum that is available for utilization.

Figure 6:
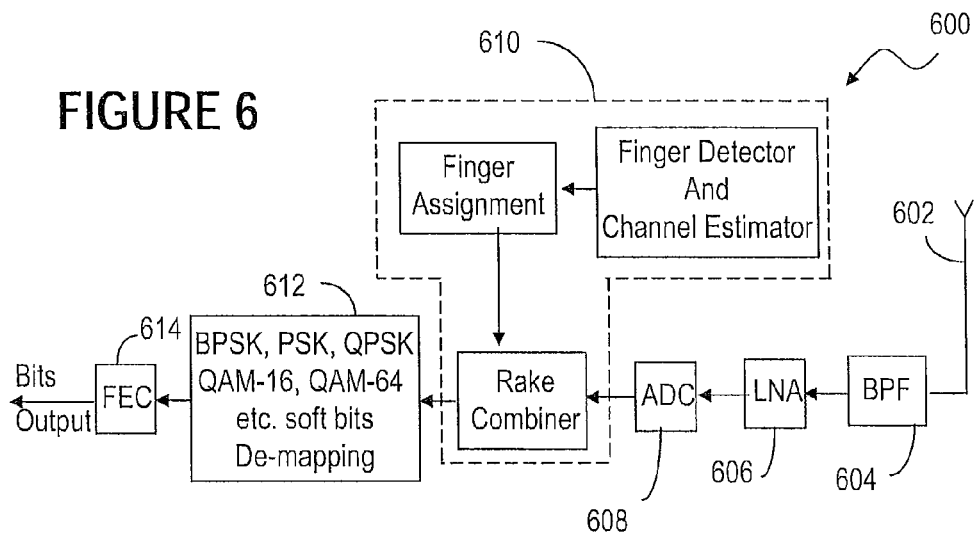
FIG. 6 is system block diagram of a communication receiver according to one aspect.

FIG. 6 is a system block diagram of a communications receiver 600 according to one aspect. Receiver 600 is operable to receive wireless signals generated by a communication system such as, but not limited to, system 500 (FIG. 5). Receiver 600 comprises an antenna unit 602, an optional band-pass filter 604, a low noise amplifier 606, an analog-to-digital converter (ADC) 608, a RAKE receiver 610, a demodulator unit 612, and an error correction unit 614. Upon antenna 602 receiving a wireless signal that is optionally filtered by band-pass filter 604, the wireless signal is amplified by the low noise amplifier 606. The low noise amplifier 606 is coupled to the input of RAKE receiver 610. Signal fading of the received wireless signal may occur as a result of the wireless signal arriving at the receiver 600 over multiple paths. The RAKE receiver 610 combines the received multi-path wireless signals in a manner that maximizes the received signal energy prior to demodulation. The output of the RAKE receiver 610 is coupled to the demodulator unit 612 for demodulation. The demodulator 612 may, for example, provide binary phase shift key (BPSK) demodulation, phase shift key (PSK) demodulation, quadrature phase shift key (QPSK) demodulation, frequency shift key (FSK) demodulation, quadrature amplitude (QAM) demodulation, QAM-16 demodulation, or any other demodulation or de-mapping technique used to recover the information data (i.e., data bits or data symbols) from the wireless signal. Once the demodulator recovers the data information, the error correction unit 614 decodes the data information in order to detect and correct bit-errors that may have occurred in the data information over the transmission path (i.e., air). The error correction unit 614 may include simple error detection, or both error detection and error correction capabilities. Although receiver 600 comprises a RAKE receiver 610, any other receiver configuration may be utilized based on the particular wireless application. One application of RAKE receivers is in code division multiple access (CDMA) cellular systems, or generally, systems that are more susceptible to multipath signal fading.

Figure 7:
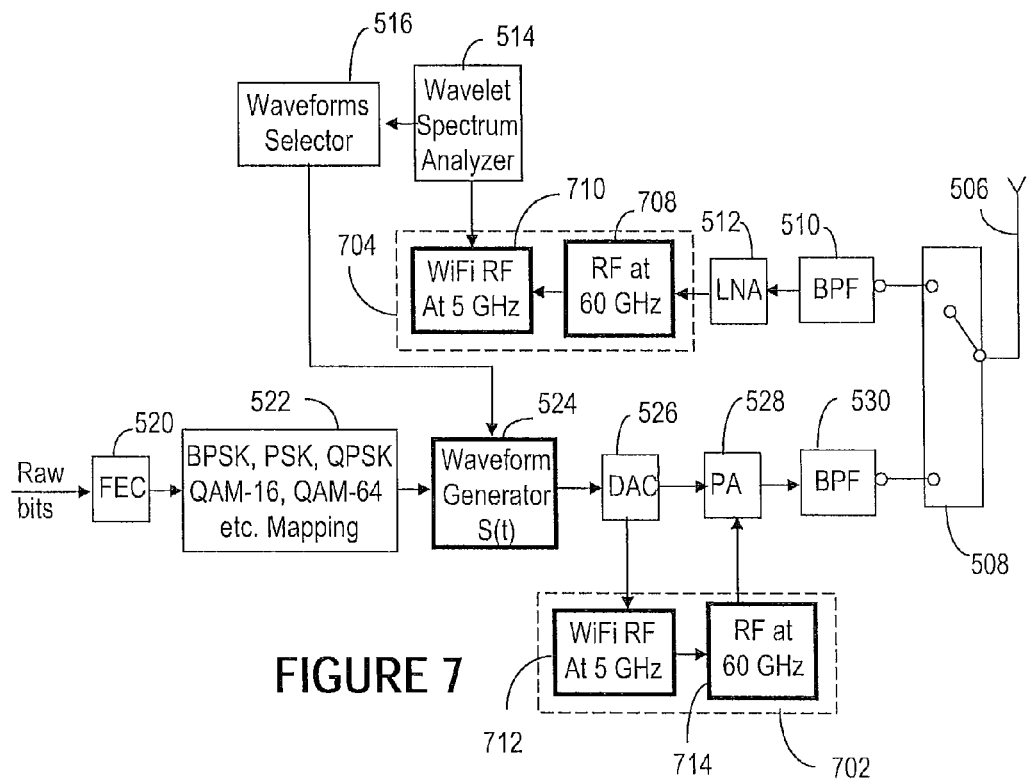
FIG. 7 is a system block diagram of a communication system according to another aspect.

FIG. 7 is system block diagram of a communications system 700 according to another aspect. The components and operation of system 700 is identical to that illustrated and described in association with communication system 500 (FIG. 5). However, system 700 illustrates a 5 GHz WiFi system application that is adapted to operate within the unlicensed 60 GHz portion of the wireless spectrum. In comparison to system 500 (FIG. 5), system 700 includes additional up-conversion unit 702 and down-conversion unit 704.

At down-conversion unit 704, the optionally filtered and amplified signals received from filter 510 and amplifier 512 are down converted from the 60 GHz region of the spectrum to an intermediate frequency in the region of 5 GHz using a convertor 708 such as a mixer. A 5 GHz WiFi receiver device 710 receives and processes the down-converted signal prior to coupling the received WiFi signal to the wavelet spectrum analyzer 514 and waveforms selector 516 for subsequent signal energy determination and wavelet waveform selection, as previously described.

At up-conversion unit 702, the data modulated wavelet waveform received from the DAC 526 is up-converted to an intermediate frequency using a 5 GHz WiFi transmitter device 712. The generated 5 GHz WiFi signal is further up-converted to the 60 GHz region of the spectrum using a converter 714 such as a mixer. Once the modulated wavelet waveform is converted to a 5 GHz WiFi signal and up-converted to the 60 GHz region, the wavelet signal is amplified, optionally filtered, and wirelessly transmitted via amplifier 528, filter 530, and antenna unit 506, respectively.

Figure 10:
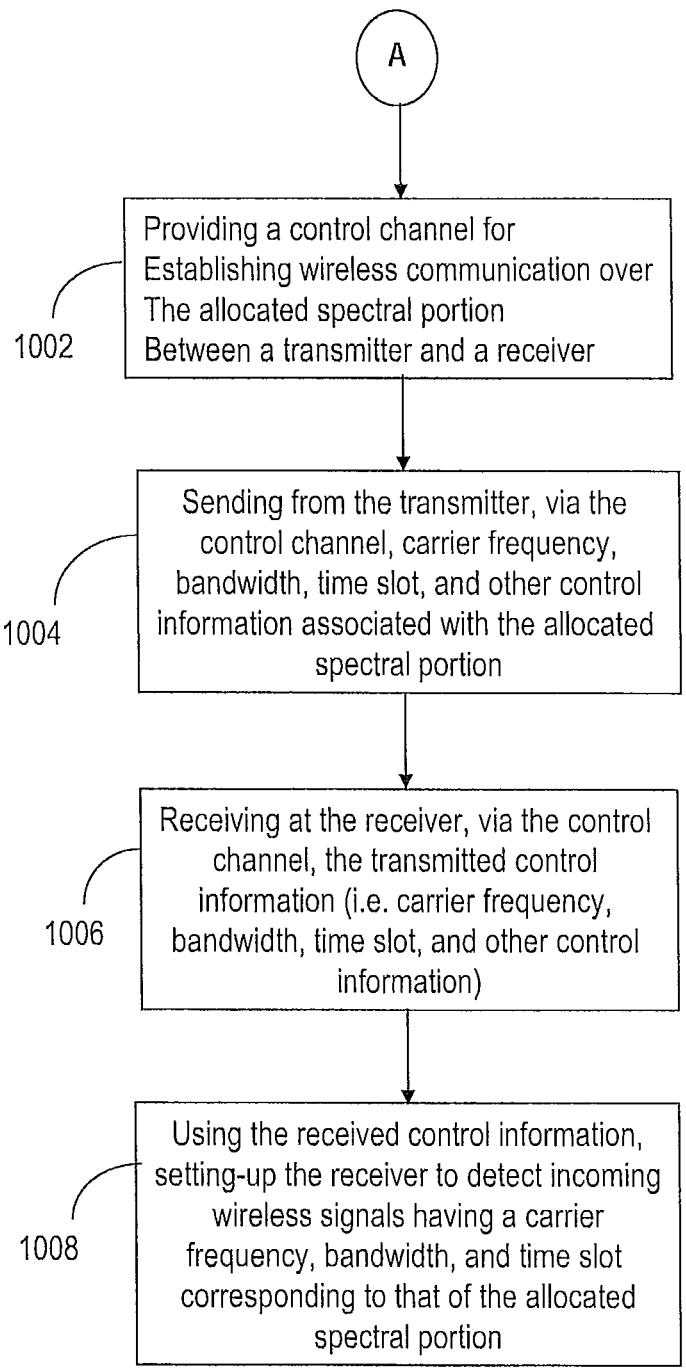
FIG. 10 is a flow diagram associated with a handshaking protocol that informs an intended receiver of one or more available spectral resources within the wireless communication spectrum.

Either system 700 (FIG. 7) or system 500 (FIG. 5) may be used in association with receiver 600 (FIG. 6). System 700 or 500 is operable to identify available portions of the wireless spectrum and transmit data modulated wavelet waveforms within these identified portions of the wireless spectrum to a receiver such as receiver 600. Since the receiver also needs to be informed of the identified portions of the wireless spectrum that become available for wireless signal transmission, a handshaking operation between system 700 or system 500, and receiver 600 occurs over a fixed frequency control channel. Accordingly, the control channel includes, among other things, information corresponding to the frequency and time slot of the identified portions of the wireless spectrum. This handshaking is described in more detail in association with FIG. 10.

Both System 500 (FIG. 5) and system 700 (FIG. 7) include wavelet analysis and wavelet generation components. In these examples (i.e., FIGS. 5 & 7), wavelet analysis is performed in association with a receiver, where the wireless communication spectrum is monitored or scanned in order detect wireless signals. Based on receiving and analyzing the received wireless signals, a corresponding wavelet signal is generated in association with a transmitter, where data information is transmitted to an intended recipient via a determined spectral resource located as a result of the wavelet analysis.

Figure 8:
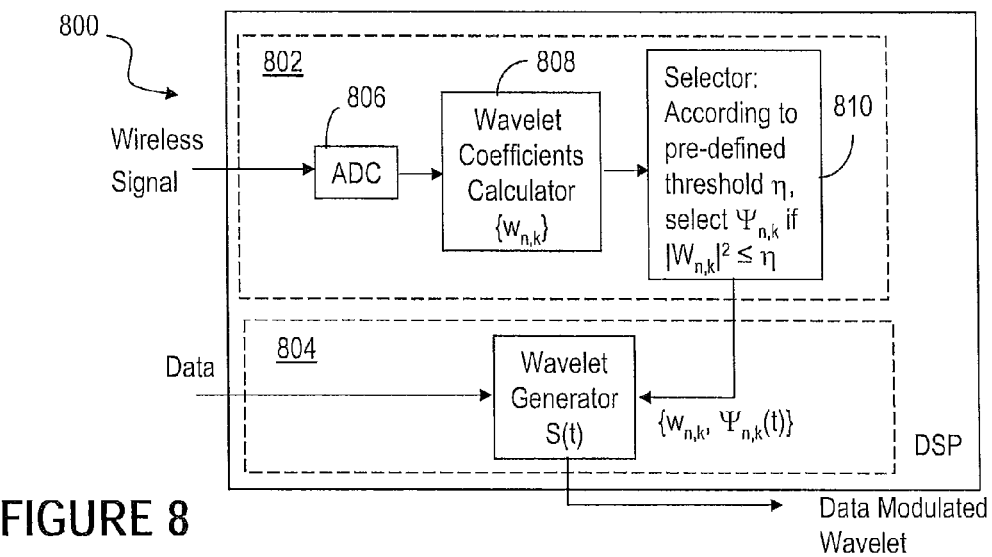
FIG. 8 is a block diagram of a wavelet generation device according to one aspect.

FIG. 8 is a block diagram of a wavelet generation device 800 according to one aspect. Wavelet generation device 800 is an integrated device that provides both wavelet analysis and wavelet signal generation. The wavelet generation device 800 can therefore be integrated within, or coupled to, any existing communication system (e.g., transceiver, repeater, etc.) for utilizing communication spectrum resources by capitalizing on wavelet characteristics. Wavelet generation device 800 comprises a wavelet analyzer 802 and a wavelet generator 804. The wavelet analyzer 802 determines the signal energy of all detectable wireless signals within a designated wireless communication spectrum. For example, in cellular systems, a designated wireless spectrum may correspond to a frequency band over which the cellular system operates. For a microwave communication system, a designated wireless spectrum may correspond to a microwave frequency band over which the microwave communication system operates. If the analyzer 802 detects one or more regions of the designated communication spectrum having low or no signal energy, the analyzer 802 accordingly identifies the frequency position and bandwidth of the low signal energy regions or the regions indicating no detectable signal energy. The wavelet generator 804 produces modulated wavelet waveforms for transmission within these regions based on the detection of low signal energy or the absence of detectable signals by the analyzer 802.

Wavelet analyzer 802 comprises an analog-to-digital converter (ADC) 806, a wavelet coefficient calculator 808, and a waveform selector 810. The input of the ADC 806 may be coupled to any receiver device operable to detect wireless signals. At the ADC 806, the received signals are converted to a digital format prior to being processed by the wavelet coefficient calculator 808 and the selector 810. The digitized signals are coupled from the ADC 806 to the wavelet coefficient calculator 808, where the wavelet coefficients (i.e., $w_{n,k}$) of the received digitized signals are calculated using:

$$w_{n,k} = \int r(t) \psi_{n,k}(t) \qquad \text{Equation 1.3}$$

where r(t) is the received signal and $\psi_{n,k}(t)$ is the wavelet function.

The calculated wavelet coefficients (i.e., $w_{n,k}$) are then used to determine signal energy by calculating, for each given signal, the squared modulus of the calculated wavelet coefficients (i.e., $|w_{n,k}|^2$). At the waveform selector 810, the determined signal energy corresponding to each detected signal is compared to a threshold energy (i.e., σ), where:

$$|w_{n,k}|^2 \leq \eta \qquad \text{Equation 1.4}$$

where η is a predefined positive number.

If the determined signal energy corresponding to each detected signal is the same as or below threshold a corresponding wavelet waveform is selected or generated. Each wavelet waveform is generated or selected based on the wavelet coefficients (i.e., $w_{n,k}$) of the signals that are below, or approximately at, threshold $\eta$.

The waveform selector 810 may couple the selected wavelet waveforms (i.e., appropriate daughter wavelets) to the wavelet generator 804 for data modulation and wireless transmission. Alternatively, the waveform selector 810 may couple appropriate n, k, p values to the wavelet generator 804. Upon receiving the n, k, p values, the wavelet generator 804 may then generate the daughter wavelet waveforms from a mother wavelet. The wavelet generator 804 receives modulated information data and combines this modulated data with the daughter wavelet waveforms. The wavelet generator 804 then couples the daughter wavelet waveforms carrying modulated data information to any transmitter device operable to transmit wireless signals to one or more intended recipients. Device 800 has been illustrated and described as having several modules, such as analog-to-digital converter (ADC) 806, wavelet coefficient calculator 808, waveform selector 810, and wavelet generator 804. However, one or more of these modules can be integrated into a single module and implemented within a single chip or part of a communication device. Alternatively, these modules may be implemented as software or firmware. In such an embodiment, the software or firmware code may be complied and loaded into the relevant hardware (i.e., chip, circuit board, etc.) of a communication system.

As previously described, the wavelet analyzer 802 may be implemented as a digital filter (not shown) that is utilized in order to determine the wavelet coefficient of received signals. Digital filter techniques may also be adopted in the generation of the appropriate daughter wavelet signals. Therefore, a digital filter circuit (not shown) may be used within the wavelet generator 804. In such an implementation, modulated data is applied to the digital filter in order to generate a modulated carrier wavelet signal for transmission within an available region (i.e., identified resource) of the communication spectrum. Alternatively, different daughter wavelet waveforms may be pre-loaded into a memory or storage device within either the selector 810 or wavelet generator 804. In this implementation, one or more stored daughter wavelet signals are accessed based on the calculated wavelet coefficients and the subsequently determined available regions within the communication spectrum.

Figure 9:
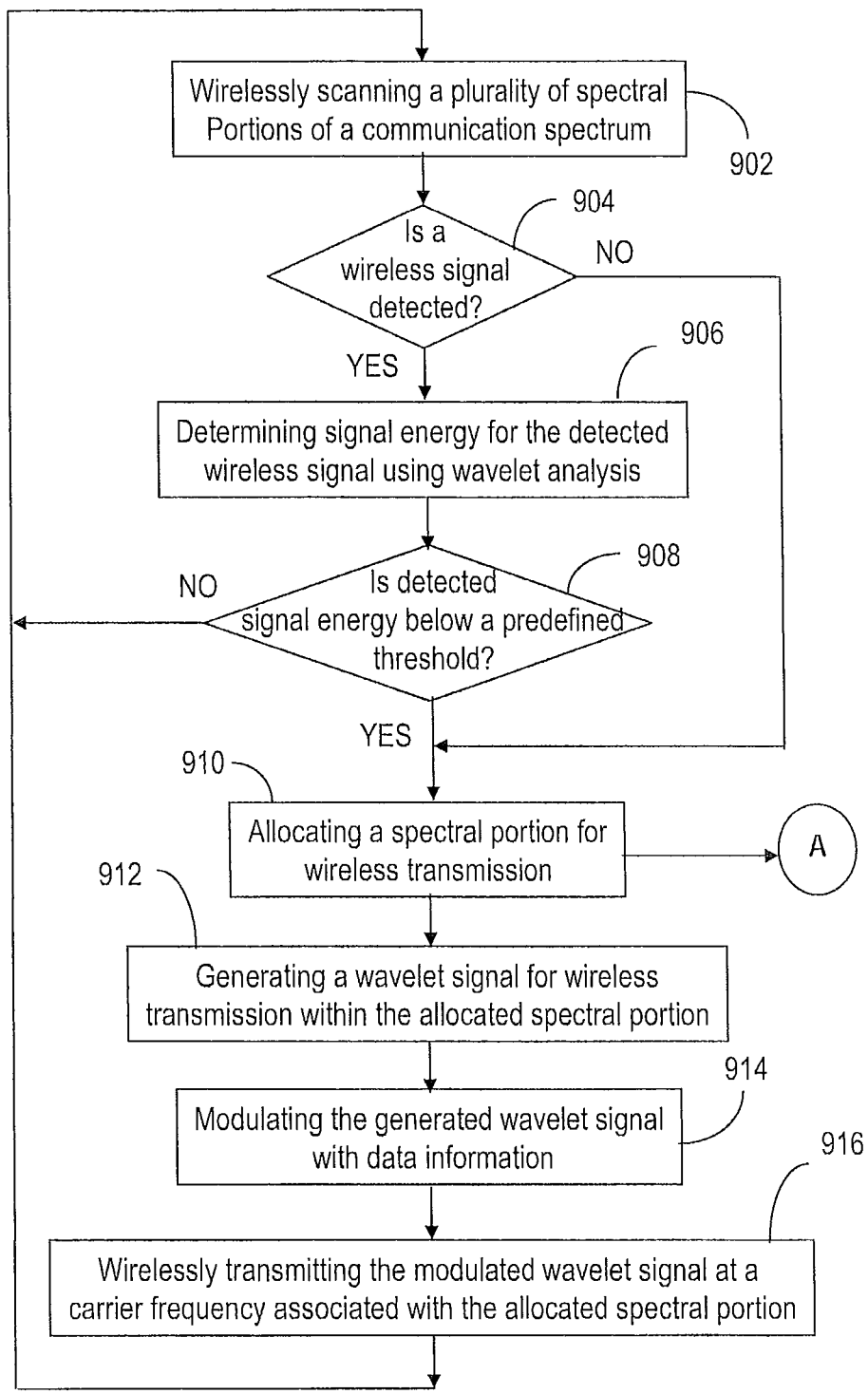
FIG. 9 is a flow diagram for utilizing spectral resources within a wireless communication system according to one aspect.

FIG. 9 is a general flow diagram 900 for utilizing spectral resources within a wireless communication system. At step 902, one or more portions of a communication spectrum is scanned or monitored in order to detect wireless signals. The bandwidth over which the communication spectrum extends depends on the application of the wireless communication system. For example, according to various applications, a wireless communication system may comprise a cellular system (e.g., GSM, CDMA, etc.), a WiFi system, a microwave system, a millimeter-wave radio system, a satellite communication system, etc. Each of these examples has different channel and frequency spectrum occupancy requirements. Therefore, the range of frequencies detected by the receiver will depend on the system application.

If a wireless signal is detected (step 904), using wavelet analysis techniques, the signal energy of the detected wireless signal is determined (step 906). As previously described, signal energy may be determined by calculating the wavelet coefficients associated with detected wireless signal. If the signal energy is below a predetermined threshold (step 908), a spectral portion associated with the frequency and occupied bandwidth of the detected wireless signal is allocated for signal transmission (step 910). Alternatively, if no wireless signal is detected (step 904), a spectral portion associated with the unoccupied frequency and its corresponding bandwidth is allocated for signal transmission (step 910).

In allocating a portion of the spectrum, it may be desirable to allocate two or more adjacent allocated spectral portions for signal transmission. Whether to allocate one or more portions of the spectrum depends of the application of the wireless system. For example, for wideband systems that require more bandwidth, two or more adjacent allocated portions of the spectrum may be assigned to accommodate the bandwidth requirements of a wideband transmitted signal.

At step 912, a wavelet signal or waveform is generated or selected for transmission within the allocated spectral portion (step 910). At step 914, modulated data (e.g., QAM-16) is combined with the generated wavelet to form a modulated carrier wavelet waveform. The modulated carrier wavelet is then transmitted within the allocated portion of the communication spectrum (916).

As previously described, the carrier wavelet is generated based on the bandwidth and timeslot availability of the detected spectral resources. The energy concentration and scalable (i.e., time & frequency) characteristics of wavelet signals facilitates the differences in resource availability. For example, the spectral resources may comprise a range of available bandwidth and time slot intervals. This is illustrated in the FIG. 1F.

Once at step 910 a spectral portion is allocated for signal transmission, a handshaking operation occurs between the transmitter and the intended receiver device. This handshaking operation is shown in flow diagram 1000 of FIG. 10. For example, at the transmitter, once the frequency, bandwidth, timeslot, and wavelet information associated with an allocated portion of the spectrum has been determined, the intended receiver device also needs to be informed (e.g., via a fixed frequency control channel) of this information for the purpose of recovering the data information. Accordingly, at step 1002, a wireless control channel for the exchange of control information between the transmitter and the receiver device is established following the spectral allocation at step 910 (FIG. 9). At step 1004, the transmitter sends, via the wireless control channel, carrier frequency, bandwidth, timeslot, wavelet characteristics, and other control information associated with the allocated spectral portion to the receiver. At step 1006, the receiver receives the carrier frequency, bandwidth, timeslot, wavelet characteristics, and other control information via the established control channel. The receiver then utilizes this received control information (i.e., frequency, bandwidth, timeslot, wavelet characteristics) to detect the wireless signal transmitted within the allocated spectral portion (step 1008).

The use of wavelet analysis and wavelet signal generation, as herein described, provides a means for detecting and utilizing available portions of a communication spectrum. Scalability and other characteristics of wavelets have been exploited to generate various systems and methods that facilitate, among other things, the increased usage of communication spectra.

Although embodiments have been described, those of skill in the art will appreciate that variations and modifications may be made without departing from the spirit and scope thereof as defined by the appended claims.

The invention claimed is:

1. A method of utilizing a wireless communication spectrum, comprising:
receiving one or more wireless signals associated with a frequency and time map within the wireless communication spectrum;
determining signal strength for the received wireless signals using wavelet analysis;
comparing the determined signal strength for the received wireless signals to one or more threshold values;
identifying as available, at least one cell within the frequency and time map based upon the comparison to the one or more thresholds;
determining a scaling parameter and a shift parameter which identify the at least one cell, with the scaling parameter identifying time and frequency values of the at least one cell and the shift parameter identifying an energy concentration center in time for a wavelet wave form in the at least one cell;
allocating the at least one cell for wireless transmission;
generating a wavelet carrier signal based on the scaling parameter and the shift parameter; and
wirelessly transmitting the wavelet carrier signal within the allocated at least one cell.

2. The method according to claim 1, further comprising exchanging control information between a transmitter and receiver, wherein prior to transmitting the wavelet carrier signal from the transmitter to the receiver, the transmitter sends the control information to the receiver via a rendezvous channel.

3. The method according to claim 2, wherein the control information comprises transmission center frequency information, transmission time slot information, and information associated with the wavelet carrier signal prior to wirelessly transmitting the carrier wavelet signal.

4. The method according to claim 1, wherein the scaling parameter dilates the wavelet signal in time and reduces the wavelet signal frequency band based on the dilation in time.

5. The method according to claim 1, wherein the scaling parameter compresses the wavelet signal in time and increases the wavelet signal frequency band based on the compression in time.

6. The method according to claim 1, wherein the shift parameter repositions the wavelet signal to one of a plurality of cells within the frequency and time map.

7. The method according to claim 1, wherein determining the signal strength comprises:
determining a plurality of wavelet coefficients corresponding to the received wireless signal; and
determining an average energy from the determined plurality of wavelet coefficients.

8. The method according to claim 7, wherein determining the average energy comprises averaging a squared modulus for each of the determined plurality of wavelet coefficients.

9. The method according to claim 1, wherein the at least one cell comprises a finite frequency band and a finite time slot.

10. The method according to claim 1, wherein allocating at least one cell comprises allocating a plurality of adjacent cells within the frequency and time map based on the threshold value exceeding the determined signal strength of the plurality of adjacent cells.

11. A method of utilizing a wireless communication spectrum, comprising:
allocating a plurality of frequency and time cells associated with the wireless communication spectrum, each of the plurality of frequency and time cells being scalable in time and frequency;
measuring wireless signal strength within each of the plurality of frequency and time cells using wavelet analysis;
determining that one or more of the plurality of frequency and time cells is available for use based on the measured wireless signal strength;
determining one or more scaling parameters and one or more shift parameters which identify the determined one or more of the plurality of frequency and time cells, with each scaling parameter identifying time and frequency values of a cell and each shift parameter identifying an energy concentration center in time for a wavelet wave form in a cell;
generating one or more wavelet signals based on the one or more scaling parameters and the one or more shift parameters; and
transmitting the one or more wavelet signals within the determined one or more of the plurality of frequency and time cells.

12. The method according to claim 11, wherein each of the plurality of frequency and time cells comprises a wireless channel within the wireless communication spectrum.

13. The method according to claim 11, wherein measuring wireless signal strength comprises:
monitoring each of the plurality of frequency and time cells for a received wireless signal;
determining a plurality of wavelet coefficients corresponding to the received wireless signal; and
determining an average energy based on the determined plurality of wavelet coefficients, and
wherein determining one or more of the plurality of frequency and time cells based on the measured wireless signal strength is based on a threshold value exceeding the determined average energy.

14. The method according to claim 11, wherein measuring wireless signal strength comprises detecting an absence of a wireless signal.

15. A method of utilizing a wireless communication spectrum, comprising:
scanning a frequency and time map having a plurality of cells for detecting at least one wireless signal using wavelet analysis, each of the plurality of cells being scalable in time and frequency;
determining that one or more of the plurality of cells is available for use based on a measured wireless signal strength;
determining one or more scaling parameters and one or more shift parameters which identify the determined one or more of the plurality of cells, the scaling parameter identifying time and frequency values of the at least one cell and the shift parameter identifying an energy concentration center in time for a wavelet wave form in the at least one cell;
generating one or more wavelet signals based on the one or more scaling parameters and the one or more shift parameters; and
transmitting the one or more wavelet signals within the determined one or more of the plurality of cells.

16. The method according to claim 15, wherein scanning the plurality of cells comprises:
scanning at least one first frequency and time cell including a first bandwidth and first time interval; and
scanning at least one second frequency and time cell including a second bandwidth and second time interval, wherein the second time interval is a multiple of the first time interval and the second bandwidth is fraction of the first bandwidth.

17. The method according to claim 15, wherein each of the at least one first and second frequency and time cell comprises a channel within the wireless communication spectrum.

18. The method according to claim 15, wherein the using of wavelet analysis to detect at least one wireless signal comprising a signal strength below a threshold value comprises:
   determining a plurality of wavelet coefficients corresponding to the detected at least one wireless signal; and
   determining the signal strength by calculating an average energy based on the determined plurality of wavelet coefficients.

19. The method according to claim 18, wherein the average energy is calculated by averaging a squared modulus for each of the determined plurality of wavelet coefficients.

* * * * *